(12) United States Patent
Kuroda et al.

(10) Patent No.: US 10,260,441 B2
(45) Date of Patent: Apr. 16, 2019

(54) ENGINE CONTROLLER AND ENGINE CONTROL METHOD

(71) Applicant: TOYOTA JIDOSHA KABUSHIKI KAISHA, Toyota-shi (JP)

(72) Inventors: Ryusuke Kuroda, Nisshin (JP); Masanao Idogawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/666,078

(22) Filed: Aug. 1, 2017

(65) Prior Publication Data
US 2018/0045130 A1    Feb. 15, 2018

(30) Foreign Application Priority Data

Aug. 10, 2016 (JP) .................. 2016-158122

(51) Int. Cl.
*F02D 1/00* (2006.01)
*F02D 41/12* (2006.01)
(Continued)

(52) U.S. Cl.
CPC ........... *F02D 41/123* (2013.01); *F02D 37/02* (2013.01); *F02D 41/0052* (2013.01);
(Continued)

(58) Field of Classification Search
CPC .... F02D 17/02; F02D 41/0087; F02D 41/123; F02D 37/02; Y02T 10/44; F02P 5/00;
(Continued)

(56) References Cited

U.S. PATENT DOCUMENTS 4,245,471 A * 1/1981 Sugasawa .................. F01N 3/20
60/276
4,274,373 A * 6/1981 Sugasawa .......... B01D 53/9454
60/276
(Continued)

FOREIGN PATENT DOCUMENTS

JP     63-124844 A    5/1988
JP     2001-221105 A  8/2001
(Continued)

OTHER PUBLICATIONS

Extended European Search Report dated Jan. 11, 2018 in Patent Application No. 17185364.1, 7 pages.
(Continued)

*Primary Examiner* — John Kwon
(74) *Attorney, Agent, or Firm* — Oblon, McClelland, Maier & Neustadt, L.L.P.

(57) ABSTRACT

An engine controller is configured to perform fuel cut-off, which temporarily stops fuel injection, calculate an in-cylinder air amount, which is an amount of air used for combustion in a cylinder, and control an engine based on the in-cylinder air amount. The engine controller includes a residual air amount calculation unit configured to calculate a residual air amount that is an amount of air in the cylinder remaining from a previous cycle during the fuel cut-off so that the residual air amount increases as the number of cycles of intake-exhaust actions in the cylinder increases during the fuel cut-off.

10 Claims, 8 Drawing Sheets

(51) Int. Cl.
 *F02D 41/00* (2006.01)
 *F02D 41/18* (2006.01)
 *F02P 5/15* (2006.01)
 *F02D 37/02* (2006.01)

(52) U.S. Cl.
 CPC ....... *F02D 41/0062* (2013.01); *F02D 41/126* (2013.01); *F02D 41/182* (2013.01); *F02P 5/1504* (2013.01); *F02D 2041/001* (2013.01); *F02D 2200/0402* (2013.01)

(58) Field of Classification Search
 CPC ............. F02M 25/072; F02M 25/0722; F02M 25/0742
 USPC ............... 123/325, 329, 332, 434, 685, 481, 123/568.11, 568.14, 568.15
 See application file for complete search history.

(56) References Cited

U.S. PATENT DOCUMENTS

| | | | | |
|---|---|---|---|---|
| 5,069,035 | A | * | 12/1991 | Kayanuma .......... F02D 41/1441 60/274 |
| 6,338,331 | B1 | * | 1/2002 | Watanabe ............... F02D 33/02 123/179.18 |
| 2009/0216427 | A1 | * | 8/2009 | Yamakawa .......... F02D 13/0215 701/103 |
| 2010/0131172 | A1 | * | 5/2010 | Willi .................. F02D 13/0211 701/103 |
| 2011/0144885 | A1 | | 6/2011 | Ohtsuka et al. |

FOREIGN PATENT DOCUMENTS

| | | |
|---|---|---|
| JP | 2002-227687 A | 8/2002 |
| JP | 2006-329065 | 12/2006 |
| JP | 2007-85228 A | 4/2007 |
| JP | 2007-239484 | 9/2007 |
| JP | 2007-239644 | 9/2007 |
| JP | 2008-309019 A | 12/2008 |
| JP | 2010-053705 | 3/2010 |
| JP | 2010-053827 | 3/2010 |
| JP | 2011-169227 | 9/2011 |
| JP | 2016-125448 A | 7/2016 |

OTHER PUBLICATIONS

Japanese Office Action dated Aug. 1, 2018 in Japanese Patent Application No. 2016-158122, 4 pages.

* cited by examiner

Entire: Y
Air: X

Entire: B+Y
Air: B+X

ENGINE CONTROLLER AND ENGINE CONTROL METHOD

BACKGROUND ART

The present invention relates to an engine controller and a method for controlling an engine that performs fuel cut-off.

One example of a vehicle engine determines the fuel injection amount in accordance with the mass of air that exists in a cylinder (hereinafter referred to as "the in-cylinder air amount") when combustion starts in the cylinder and controls the air-fuel ratio of an air-fuel mixture burned in the cylinder at a desired value. Some of the burned gas generated by the combustion in the cylinder is not scavenged and remains in the cylinder. That is, the residual burned gas exists in the cylinder during the next combustion. This is referred to as internal exhaust gas recirculation (internal EGR). Such residual burned gas is inert gas that does not contribute to combustion. Thus, when combustion is successively performed, the residual burned gas may be ignored, and the fuel injection amount may be determined taking into account only the amount of fresh air supplied to the cylinder in the intake stroke (hereinafter referred to as "the in-cylinder intake air amount").

A vehicle engine may perform fuel cut-off that temporarily stops fuel injection such as when the vehicle is coasting to reduce fuel consumption. Combustion does not occur during the fuel cut-off, and the residual burned gas is replaced by air in the cylinders. The first time combustion is performed in each cylinder after the fuel cut-off ends and fuel injection restarts, and the amount of air existing in each cylinder corresponds to the total of the mass of air remaining in the cylinder from the previous cycle (hereinafter referred to as "the residual air amount") and the in-cylinder intake air amount. Consequently, if the fuel injection amount is determined based on the in-cylinder intake air amount, the air-fuel ratio becomes leaner than expected. This may lead to misfiring or cause undesirable emission.

In Japanese Laid-Open Patent Publication No. 2006-329065, the residual air amount is obtained. Then, the residual air amount is added to the amount of fresh inflow air to obtain the in-cylinder air amount for the first combustion performed in each cylinder after fuel injection is restarted. The residual air amount is calculated based on the engine rotation speed, the intake pressure, and the valve overlap amount.

In the described technique, the in-cylinder air amount for the first combustion in each cylinder after fuel injection restarts takes into account the residual air amount. However, the burned gas generated before fuel cut-off starts remains in the cylinder immediately after the fuel cut-off starts. Such residual burned gas is not completely scavenged from the cylinder in the first exhaust stroke after the fuel cut-off starts. Some of the burned gas remains in the cylinder even after the first exhaust stroke. The replacement of residual burned gas with air during the fuel cut-off does not suddenly occur immediately after the fuel cut-off starts. The replacement occurs in a stepped manner whenever the intake-exhaust cycle is repeated. The described technique does not take into account such stepped scavenging of the residual burned gas that occurs during the fuel cut-off. Thus, if the fuel cut-off ends within a short period, the residual air amount may not be accurately obtained.

It is an object of the present invention to provide an engine controller and an engine control method that obtains the amount of air remaining in a cylinder from a previous cycle when restarting fuel injection and performing combustion for the first time.

SUMMARY OF THE INVENTION

To achieve the above object, an engine controller is configured to perform fuel cut-off, which temporarily stops fuel injection, calculate an in-cylinder air amount, which is an amount of air used for combustion in a cylinder, and control an engine based on the in-cylinder air amount. The engine controller includes a residual air amount calculation unit configured to calculate a residual air amount that is an amount of air in the cylinder remaining from a previous cycle during the fuel cut-off so that the residual air amount increases as a number of cycles of intake-exhaust actions in the cylinder increases during the fuel cut-off.

As described above, the residual burned gas is replaced by air during fuel cut-off in a stepped manner in accordance with the cycles of intake-exhaust actions. This increases the residual air amount in a cylinder during the fuel cut-off as the number of cycles of intake-exhaust actions in the cylinder increases after the fuel cut-off starts.

According to the configuration described above, the residual air amount is calculated so that the residual air amount increases as the number of cycles of intake-exhaust actions in the cylinder during the fuel cut-off increases. A calculated value of the residual air amount thus changes in the same manner as the actual residual air amount that increases during fuel cut-off in a stepped manner in accordance with the cycles of intake-exhaust actions. The engine controller accurately calculates the amount of air remaining in the cylinder from the previous cycle when combustion is performed for the first time after fuel injection is restarted.

The residual air amount calculation unit in the engine controller may calculate a residual air amount in the following manner. The residual air amount calculation unit is configured to set the residual air amount when fuel cut-off starts to "0" and renew the residual air amount in each cycle of the engine during a period from when the fuel cut-off starts to when the fuel injection restarts using an equation of $$X[i]=A\times(B+X[i-1])/(B+A)$$

where "$X[i-1]$" represents a residual air amount before renewal, "$X[i]$" represents a residual air amount after renewal, "B" represents an in-cylinder intake air amount that is the amount of fresh air drawn into a cylinder from an intake air passage during an intake stroke, and "A" represents a maximum residual air amount that is the amount of air when gas remaining in the cylinder from a previous cycle is all air.

In the engine, the fuel injection amount is determined in correspondence with the amount of air used for combustion in the cylinder to control the air-fuel ratio of air-fuel mixture combusted in the cylinder at a desired value. When combustion is successively performed in the cylinder, the amount of fresh air drawn into the cylinder from an intake air passage during the intake stroke ("in-cylinder intake air amount") is the amount of air used for combustion ("in-cylinder air amount"). When combustion is performed for the first time after fuel injection is restarted, an amount of air corresponding to the sum of the in-cylinder intake air amount and the residual air amount is used for combustion in the cylinder.

The engine controller further includes a fuel injection amount calculation unit configured to calculate a fuel injection amount that corresponds to the in-cylinder air amount.

The fuel injection amount calculation unit is configured to calculate a fuel injection amount for when combustion is performed for a first time in the cylinder after fuel injection is restarted by setting the in-cylinder air amount to a sum of the residual air amount and an in-cylinder intake air amount that is an amount of fresh air drawn into a cylinder from an intake air passage during an intake stroke and calculate the fuel injection amount for when combustion is performed subsequent to the first time by setting the in-cylinder intake air amount as the in-cylinder air amount. This prevents the air-fuel ratio immediately after fuel injection restarts from becoming lean and ensures that combustion is restarted.

The engine includes a plurality of cylinders. The engine controller is configured to perform partial fuel cut-off in which fuel cut-off is performed in some of the cylinders. The fuel injection amount calculation unit is configured to calculate, when the partial fuel cut-off ends and the fuel injection restarts, the fuel injection amount based on the sum of the residual air amount and the in-cylinder intake air amount for only the cylinders that have been subject to the partial fuel cut-off.

The residual air amount changes only during each intake-exhaust cycle, and thus the residual air amount calculation unit only needs to calculate the residual air amount during the fuel cut-off once in each cycle of the engine. The fuel injection amount is usually calculated as a fixed crank angle process performed a number of times for each cycle of the engine, and the in-cylinder intake air amount is usually calculated in a routine process performed in certain intervals. Thus, the fuel injection amount calculated from the residual air amount and the in-cylinder intake air amount will be affected by the time at which these parameters are obtained especially when combustion is performed for the first time after fuel injection is restarted. To ensure that the residual air amount and the in-cylinder intake air amount are correctly reflected in the residual air amount, the engine controller includes an in-cylinder intake air amount calculation unit, which calculates the in-cylinder intake air amount as a routine process performed in certain intervals, and an all-cylinder injection determination unit, which determines whether or not fuel injection has been performed in all of the cylinders of the engine after the fuel injection is restarted. The fuel injection amount calculation unit is configured to calculate the fuel injection amount as a fixed crank angle process, start calculation of the fuel injection amount based on the sum of the residual air amount and the in-cylinder intake air amount when fuel injection is restarted, and end the calculation of the fuel injection amount when the all-cylinder injection determination unit makes an affirmative determination. The residual air amount last calculated by the residual air amount calculation unit before fuel injection is restarted is reflected in the calculation of the fuel injection amount when combustion is performed for the first time in each cylinder of the engine after fuel injection is restarted.

When the residual air amount is reflected in the calculation of the fuel injection amount for combustion which is performed for the first time after fuel injection is restarted, engine torque is increased by the residual air amount. Consequently, if the torque control of the engine is executed in accordance with the requested torque without any adjustments, the engine torque that exceeds the requested torque may be generated immediately after fuel injection is restarted. In this regard, the engine controller further includes an ignition timing adjustment unit that adjusts an ignition timing in accordance with a requested torque that is a requested value of engine torque. The ignition timing adjustment unit is configured to adjust the ignition timing based on the requested torque and the residual air amount so that the ignition timing is retarded as the residual air amount increases when combustion is performed for the first time in the cylinder after fuel injection is restarted. This offsets an increase in the engine torque caused by the residual air amount with the retardation of the ignition timing, and situations are limited in which the generated engine torque exceeds the requested torque immediately after fuel injection is restarted.

The fuel injection amount is usually calculated as a fixed crank angle process, and the ignition timing is usually calculated as a routine process performed in certain intervals. Consequently, the period for calculation of the fuel injection amount applied to combustion performed for the first time in the cylinder after fuel injection is restarted differs from the period for calculation of the ignition timing applied to the first combustion. In this regard, the engine controller further includes an all-cylinder injection determination unit, which is configured to determine whether or not fuel injection has been performed in all of the cylinders of the engine after fuel injection is restarted, and an all-cylinder ignition determination unit, which is configured to determine whether or not ignition has been performed in all of the cylinders of the engine after fuel injection is restarted. The fuel injection amount calculation unit calculates the fuel injection amount as a fixed crank angle process, starts calculation of the fuel injection amount based on the sum of the residual air amount and the in-cylinder intake air amount when fuel injection is restarted, and ends the calculation of the fuel injection amount when the all-cylinder injection determination unit makes an affirmative determination. The ignition timing adjustment unit adjusts the ignition timing as a routine process performed in certain intervals, and starts adjustment of the ignition timing based on the requested torque and the residual air amount when fuel injection restarts and ends the adjustment of the ignition timing when the all-cylinder ignition determination unit makes an affirmative determination. That is, the timings for ending the reflection of the residual air amount on the fuel injection amount and the ignition timing after fuel injection are separately determined.

The engine torque may exceed the requested torque immediately after fuel injection is restarted due to the residual air amount in the cylinder. However, such a situation is limited by offsetting increases in the engine torque with the retardation of the ignition timing. Additionally, excessive engine torque may also be avoided by reducing the residual air amount and the in-cylinder intake air amount. The reduction of the in-cylinder intake air amount can be limited to only one cycle after fuel injection is restarted by controlling a variable valve mechanism that varies a valve characteristic. More specifically, the engine includes a variable valve mechanism that varies a valve characteristic of an intake valve. The engine controller includes an air reduction control unit configured to control the variable valve mechanism in accordance with the residual air amount so that the in-cylinder intake air amount decreases as the residual air amount increases when combustion is performed for the first time in the cylinder after fuel injection is restarted. This limits the generation of engine torque that exceeds the requested torque immediately after fuel injection is restarted resulting from the residual air in the cylinder.

A method for controlling an engine that achieves the above object includes performing fuel cut-off to temporarily stop fuel injection, obtaining an in-cylinder air amount that is an amount of air used for combustion in a cylinder and controlling an engine based on the in-cylinder air amount, and calculating a residual air amount that is an amount of air in the cylinder remaining from a previous cycle during the fuel cut-off so that the residual air amount increases as a number of cycles of intake-exhaust actions in the cylinder increases during the fuel cut-off.

An engine controller that achieves the above object includes circuitry configured to perform fuel cut-off to temporarily stop fuel injection, obtain an in-cylinder air amount that is an amount of air used for combustion in a cylinder and control an engine based on the in-cylinder air amount, and calculate a residual air amount that is an amount of air in the cylinder remaining from a previous cycle during the fuel cut-off so that the residual air amount increases as a number of cycles of intake-exhaust actions in the cylinder increases during the fuel cut-off.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

First Embodiment

An engine controller according to a first embodiment will now be described with reference to FIGS. 1 to 7.

Figure 1:
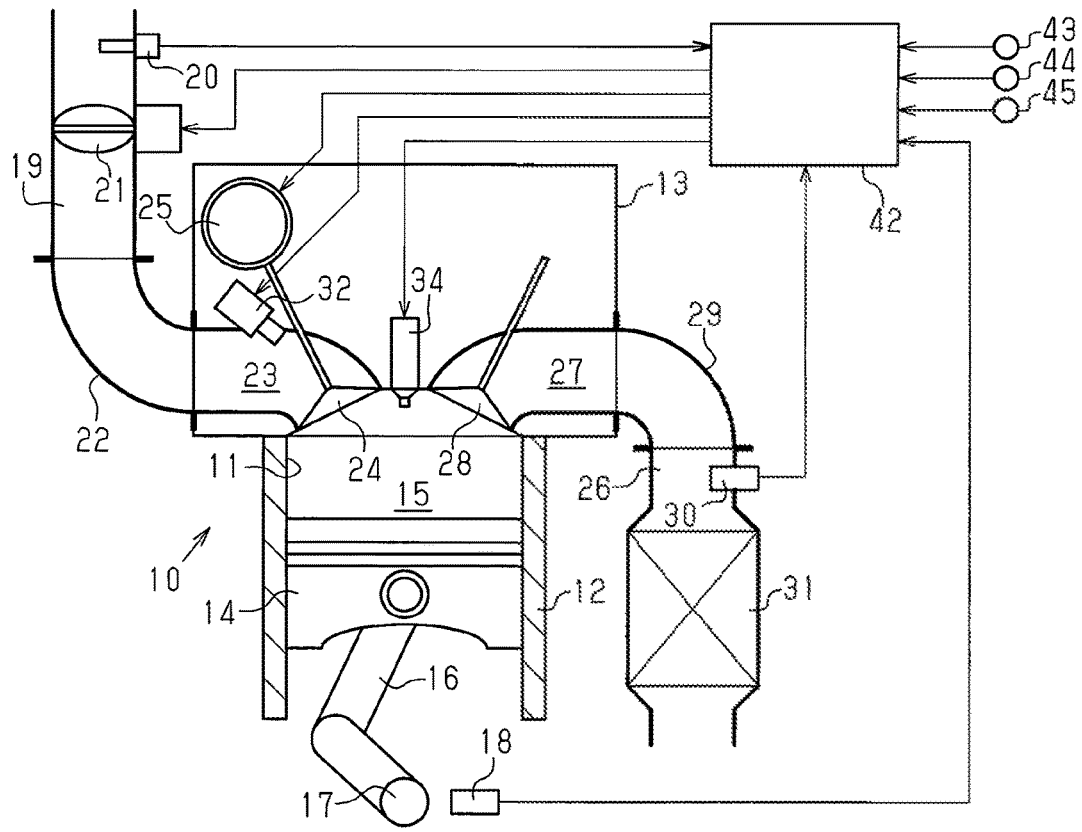
FIG. 1 is a schematic diagram showing an engine controller according to a first embodiment and the structure of an engine that employs the engine controller.

As shown in FIG. 1, an engine 10 that employs an engine controller includes a cylinder block 12 having a cylinder 11 and a cylinder head 13 arranged on the cylinder block 12. The engine 10 is a V-type eight-cylinder vehicle engine and includes eight cylinders 11. FIG. 1 shows only one of these cylinders 11.

As shown in FIG. 1, each cylinder 11 includes a piston 14 that reciprocates up and down. A combustion chamber 15 is defined in the cylinder 11 by the piston 14. Each piston 14 is connected by a connecting rod 16 that converts the reciprocating movement of the piston 14 into rotational movement to a crankshaft 17 functioning as an output shaft of the engine 10. A crank angle sensor 18 that detects the rotational phase (hereinafter referred to as "the crank angle") of the crankshaft 17 is arranged near the crankshaft 17.

The engine 10 includes an intake air passage 19 that supplies intake air to each cylinder 11. The intake air passage 19 includes an airflow meter 20 that detects the flow amount of intake air flowing in the intake air passage 19 (hereinafter "intake air flow amount GA") and a throttle valve 21 for adjusting the intake air flow amount GA. An intake manifold 22 functioning as a branch pipe for distributing intake air to each cylinder is provided downstream of the throttle valve 21 in the intake air passage 19. The intake air passage 19 is connected by an intake port 23 for each cylinder in the cylinder head 13 to each cylinder 11. A fuel injection valve 32 that injects fuel into intake air flowing in the intake port 23 is arranged in the intake port 23 of each cylinder 11.

An intake valve 24 that opens or closes the combustion chamber 15 at the intake port 23 is provided for each cylinder in the cylinder head 13. An ignition plug 34 is arranged in the combustion chamber 15 of each cylinder 11. The engine 10 includes a valve timing varying mechanism 25 functioning as a variable valve mechanism that varies valve characteristics. The valve timing varying mechanism 25 varies the timing for opening or closing the intake valve 24 (valve timing).

The engine 10 includes an exhaust passage 26 in which exhaust generated by combustion in the cylinder 11 flows. The exhaust passage 26 is connected by an exhaust port 27 for each cylinder in the cylinder head 13 to the combustion chamber 15 of each cylinder 11. An exhaust valve 28 that opens or closes the combustion chamber 15 at the exhaust port 27 is provided for each cylinder in the cylinder head 13. The exhaust passage 26 includes an exhaust manifold 29 functioning as a junction pipe for combining exhaust discharged through the exhaust port 27 from the combustion chamber 15 of each cylinder 11. An air-fuel ratio sensor 30 for detecting an air-fuel ratio ABF of an air-fuel mixture burned in the combustion chamber 15 and a catalyst converter 31 for purifying the exhaust are arranged downstream of the exhaust manifold 29 in the exhaust passage 26.

Detection results of various sensors are input to an electronic control unit 42 functioning as an engine controller used for the engine 10 with the structure described above. The various sensors includes the crank angle sensor 18, the airflow meter 20, the air-fuel ratio sensor 30, an accelerator pedal sensor 43 that detects an accelerator pedal depression amount ACCP of the driver, a throttle sensor 44 that detects the position of the throttle valve 21 (throttle open degree TA), and a coolant temperature sensor 45 that detects the coolant temperature THW of the engine 10. The electronic control unit 42 calculates a rotational speed NE of engine from the detection result of the crank angle sensor 18. The electronic control unit 42 may be configured as circuitry including 1) one or more dedicated hardware circuits such as an ASIC, 2) one or more processors operating according to a computer program (software), or 3) any combinations thereof. A processor includes a CPU and a memory such as a RAM and a ROM, whereas a memory stores a program code or a command configured to cause a CPU to perform a process. A memory, that is, a computer readable medium may include any available medium accessible by a versatile or dedicated computer.

The electronic control unit 42 controls the torque of the engine 10 through torque demand control. In the torque demand control, the electronic control unit 42 calculates first requested torque, which is a requested value of engine torque, using the accelerator pedal depression amount ACCP and the rotational speed NE of engine. The electronic control unit 42 then calculates, as a requested air amount, the amount of air supplied to each cylinder 11 that is required to cause the engine torque to be equal to the requested torque, thus controlling the throttle open degree TA and the valve timing of the intake valve 24 such that the requested amount of air is supplied to each cylinder 11. The requested air amount is set to be in the achievable range by including a response delay from when a change in the throttle open degree TA or the valve timing is commanded until when the amount of air supplied to each cylinder 11 is changed in practice. Additionally, the electronic control unit 42 adjusts the ignition timing of the ignition plug 34 so as to compensate for the response delay in the amount of supplied air. That is, when the requested air amount is greater than the requested torque, the electronic control unit 42 retards the ignition timing to reduce combustion efficiency. When the requested air amount is less than the requested torque, the electronic control unit 42 advances the ignition timing to increase combustion efficiency so that the engine torque becomes close to the requested torque.

The electronic control unit 42 performs, as part of engine control, fuel cut-off in which fuel injection temporarily stops. The electronic control unit 42 starts the fuel cut-off when a predetermined fuel cut-off start condition is satisfied and ends the fuel cut-off when a predetermined fuel injection restart condition (a fuel cut-off end condition) is satisfied. For example, the fuel cut-off start condition includes that the throttle open degree TA is less than or equal to a predetermined value and the rotational speed NE of engine is greater than or equal to a predetermined fuel cut-off rotational speed. For example, the fuel injection restart condition includes that the throttle open degree TA is greater than a predetermined value or the rotational speed NE of engine is less than or equal to a predetermined fuel-injection restart rotational speed that is set to be less than the fuel cut-off rotational speed. Ignition of each cylinder 11 by the ignition plug 34 stops during the fuel cut-off. The electronic control unit 42 turns on a fuel cut-off signal FC when the fuel cut-off starts and turns off the fuel cut-off signal FC when the fuel cut-off ends, thus being capable of checking whether the fuel cut-off is performed during other control.

The electronic control unit 42 executes engine control using a load factor KL as an index value of an in-cylinder air amount that is the amount of air in each cylinder 11 during combustion. The load factor KL is the ratio of the in-cylinder air amount to the maximum in-cylinder intake air amount wherein the maximum in-cylinder air amount is "1". The maximum in-cylinder intake air amount is the maximum amount of air that can be taken in the cylinder 11 in an intake stroke when atmospheric pressure Pa is standard atmosphere P0 (=101.325 [Pa]), which corresponds to the amount of air in the standard atmosphere P0 that is filled in space equal to the volume displaced by the piston 14. The displacement of the piston 14 is obtained by subtracting the volume of the cylinder 11 when the piston 14 is at the top dead center (combustion chamber volume Vmin) from the volume of the cylinder 11 when the piston 14 is at the bottom dead center.

The maximum in-cylinder air amount is a constant and thus the load factor KL is proportional to the in-cylinder air amount. In engine control, the electronic control unit 42 uses various amounts of air by converting each amount of air into the load factor KL corresponding to the in-cylinder air amount equal to the amount of air (hereinafter referred to as "the load factor converted value"). That is, the load factor KL is the load factor converted value of the in-cylinder air amount.

The electronic control unit 42 calculates the fuel injection amount of the fuel injection valve 32 based on the load factor KL. Specifically, the electronic control unit 42 calculates a base injection amount QB from the load factor KL and performs, on the base injection amount QB, corrections such as a coolant temperature correction according to the coolant temperature THW and an air-fuel ratio feedback correction according to the deviation of the air-fuel ratio ABF from a target air-fuel ratio TABF, thus calculating a final injection amount QF, which is a fuel injection amount actually commanded to the fuel injection valve 32. The electronic control unit 42 calculates the base injection amount QB such that the mass ratio of fuel to the in-cylinder air amount is equal to the target air-fuel ratio TABF that is the target value of the air-fuel ratio ABF.

The electronic control unit 42 calculates, in certain intervals, a predicted load factor KLNEW, which is the load factor converted value of a predicted value of the amount of fresh air drawn into the cylinder 11 in an intake stroke (in-cylinder intake air amount), from the intake air flow amount GA, the rotational speed NE of engine, and the throttle open degree TA. In an exhaust stroke, some of the gas in the cylinder 11 is not scavenged and remains in the cylinder 11 during the next combustion. Consequently, during combustion, the fresh air drawn in during the intake stroke (new air) and gas remaining in the cylinder 11 from the previous cycle (residual gas) exist in the cylinder 11. When combustion is successively performed in each cycle, the remaining gas generated in the previous cycle is inert burned gas that does not contribute to combustion. In such a case, the in-cylinder air amount is equal to the in-cylinder intake air amount and the load factor KL is also equal to the predicted load factor KLNEW. Consequently, no problem occurs if the fuel injection amount is calculated by using the predicted load factor KLNEW as the load factor KL.

When combustion does not occur during fuel cut-off, the remaining gas is replaced by air that contributes to combustion. The in-cylinder air amount when combustion is performed for the first time in each cylinder 11 after restarting the fuel injection, which was stopped during the fuel cut-off, is greater than the in-cylinder intake air amount by the amount of air remaining in the cylinder 11 from the previous cycle (residual air amount). Consequently, when combustion is performed for the first time in the cylinder 11 after fuel injection is restarted, if the fuel injection amount is calculated by using the predicted load factor KLNEW as the load factor KL, the air-fuel ratio ABF is leaner than the target air-fuel ratio TABF. This may lead to misfiring or cause undesirable emission. The electronic control unit 42 thus calculates a remaining load factor KLRES that is the load factor converted value of the residual air amount and when combustion is performed for the first time in the cylinder 11 after fuel injection is restarted, the electronic control unit 42 calculates the fuel injection amount by including the remaining load factor KLRES.

Figure 2:
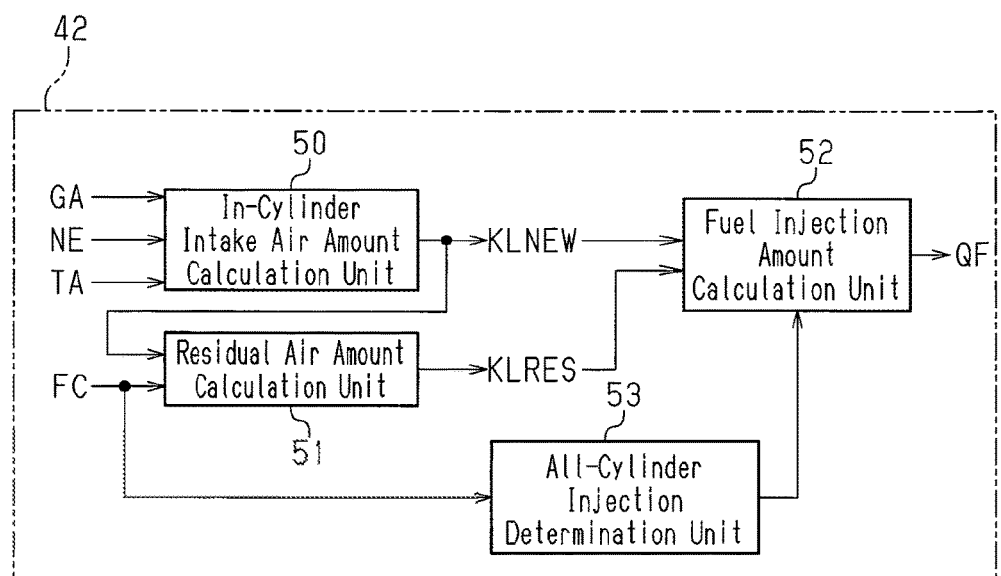
FIG. 2 is a schematic diagram showing the configuration of the engine controller shown in FIG. 1.

FIG. 2 shows the control configuration of the electronic control unit 42 that executes the fuel injection amount control described above. As shown in FIG. 2, the electronic control unit 42 includes, as the control configuration for the fuel injection amount control, an in-cylinder intake air amount calculation unit 50, a residual air amount calculation unit 51, a fuel injection amount calculation unit 52, and an all-cylinder injection determination unit 53.

The in-cylinder intake air amount calculation unit 50 functions to calculate the predicted load factor KLNEW in the electronic control unit 42 and performs an in-cylinder intake air amount calculation process for calculating the predicted load factor KLNEW as a routine process performed in certain intervals. The in-cylinder intake air amount calculation unit 50 includes a physical model that reproduces the intake behavior of an intake system in the engine 10. The in-cylinder intake air amount calculation unit 50 uses the physical model to calculate the predicted load factor KLNEW from the intake air flow amount GA, the rotational speed NE of engine, and the throttle open degree TA.

The residual air amount calculation unit 51 performs a residual air amount renewal process in each cycle of the engine 10, that is, as a fixed crank angle process for every 720° CA. When performing the residual air amount renewal process, the residual air amount calculation unit 51 reads the predicted load factor KLNEW and the fuel cut-off signal FC to renew the remaining load factor KLRES, which is the load factor converted value of the residual air amount.

The fuel injection amount calculation unit 52 performs a fuel injection amount calculation process for calculating the final injection amount QF. The fuel injection amount calculation process is performed before fuel injection in each cylinder 11 as a fixed crank angle process for every predetermined crank angle. Specifically, the fuel injection amount calculation process is performed at a crank angle before the crank angle at which each piston 14 reaches the intake top dead center by a predetermined angle (for example, 30° CA). The fuel injection amount calculation process is performed, for each cycle of the engine 10, the same number of times as the number of the cylinders 11 in the engine 10. For example, in the engine controller used for the eight-cylinder engine 10 as in the present embodiment, the fuel injection amount calculation process is performed eight times in a cycle of the engine 10 at intervals of 90° CA.

The all-cylinder injection determination unit 53 performs an all-cylinder injection determination process of determining whether fuel injection is performed in all cylinders in the engine 10 after fuel injection restarts. The all-cylinder injection determination process is an interrupt process that is performed whenever fuel injection is performed in each cylinder 11 in the engine 10.

<All-Cylinder Injection Determination Process>

Figure 3:
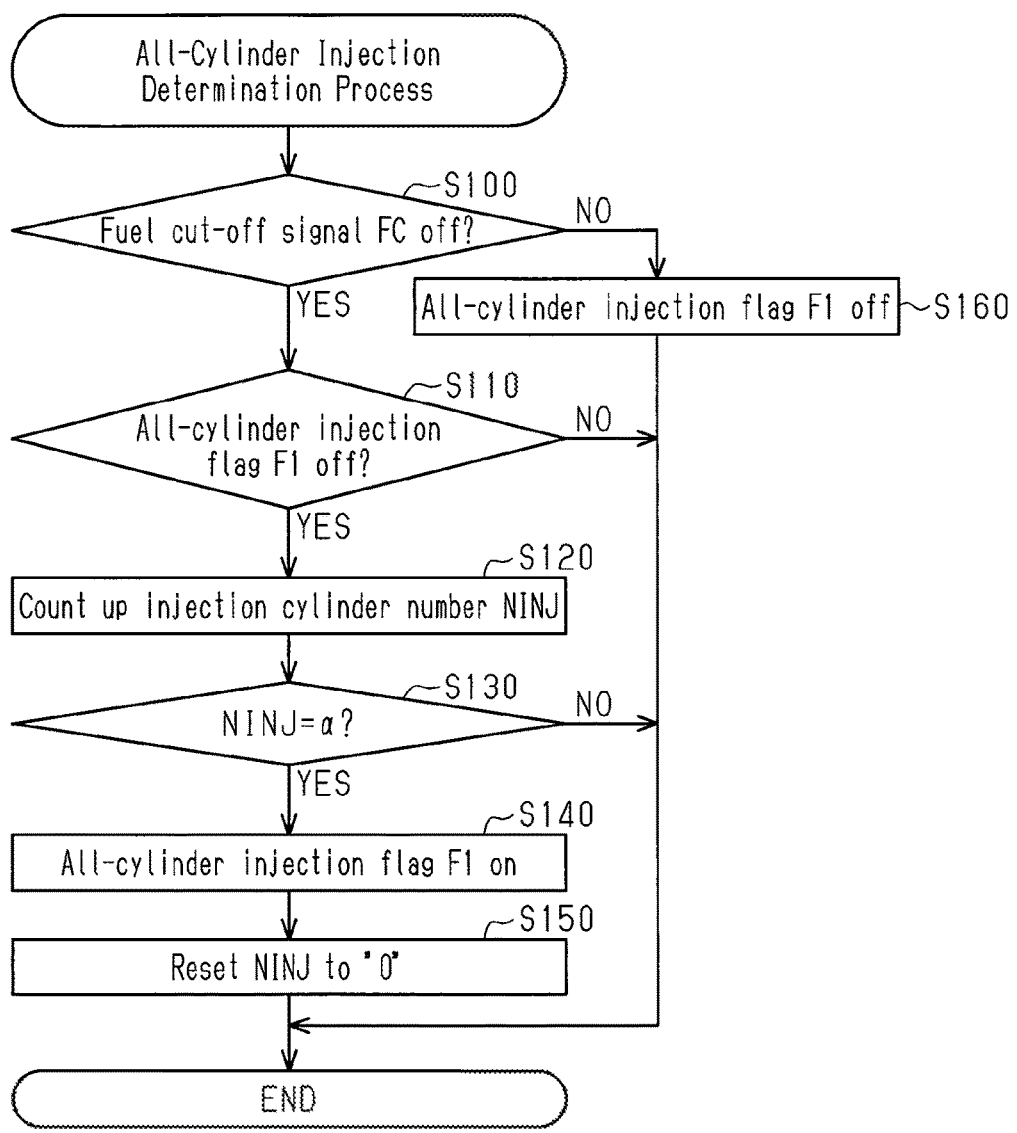
FIG. 3 is a flowchart of an all-cylinder injection determination process performed by an all-cylinder injection determination unit in the engine controller shown in FIG. 1.

FIG. 3 is a flowchart of the all-cylinder injection determination process performed by the all-cylinder injection determination unit 53. As described above, the all-cylinder injection determination process is performed whenever fuel injection is performed in each cylinder 11. The number of times that the all-cylinder injection determination process is performed in a predetermined period is equal to the number of times that fuel injection is performed in the predetermined period.

When the all-cylinder injection determination process starts, it is determined in step S100 whether the fuel cut-off signal FC is off. When the fuel cut-off signal FC is on, that is, when fuel cut-off is performed (NO in S100), an all-cylinder injection flag F1 is turned off in step S160, and then this process ends.

When the fuel cut-off signal FC is off (YES in S100), the process proceeds to step S110, and it is determined in step S110 whether the all-cylinder injections flag F1 is off. When the all-cylinder injection flag F1 is on (NO in S110), this process ends. When the all-cylinder injection flag F1 is off (YES in S110), the process proceeds to step S120.

When the process proceeds to step S120, the number NINJ of injection cylinders, which is a counter for counting the number of the cylinders 11 that perform fuel injection after fuel injection restarts, is counted up in step S120. It is determined in step S130 whether the number NINJ of injection cylinders is equal to the number α of cylinders in the engine 10 ("8" in the present embodiment). When the number NINJ of injection cylinders is less than the number α of cylinders (NO in S130), the process ends. When the number NINJ of injection cylinders is equal to the number α of cylinders (YES in S130), the process proceeds to step S140.

When the process proceeds to step S140, the all-cylinder injection flag F1 is turned on in step S140. The number NINJ of injection cylinders is reset to "0" in step S150 and then the process in the routine ends.

In the all-cylinder injection determination process, the all-cylinder injection flag F1 is turned off when fuel cut-off starts. After fuel injection restarts, the number NINJ of injection cylinders is counted up whenever the all-cylinder injection determination process is performed. When the number NINJ of injection cylinders is equal to the number α of cylinders in the engine 10, the all-cylinder injection flag F1 is turned on. The all-cylinder injection determination process is performed whenever fuel injection is performed in each cylinder 11 in the engine 10 as described above, and thus the number NINJ of injection cylinders is equal to the number of times that fuel injection is performed in the engine 10 after fuel injection restarts. The all-cylinder injection flag F1 is thus turned on when the number of times that fuel injection is performed in the engine 10 after fuel injection restarts is equal to the number α of cylinders in the engine 10, that is, when fuel injection is performed in all the cylinders 11 in the engine 10 after fuel injection restarts. The all-cylinder injection determination unit 53 turns the all-cylinder injection flag F1 from off to on to externally output a determination result as to whether fuel injection is performed in all cylinders 11 in the engine 10 after fuel injection restarts.

<Residual Air Amount Renewal Process>

Figure 4:
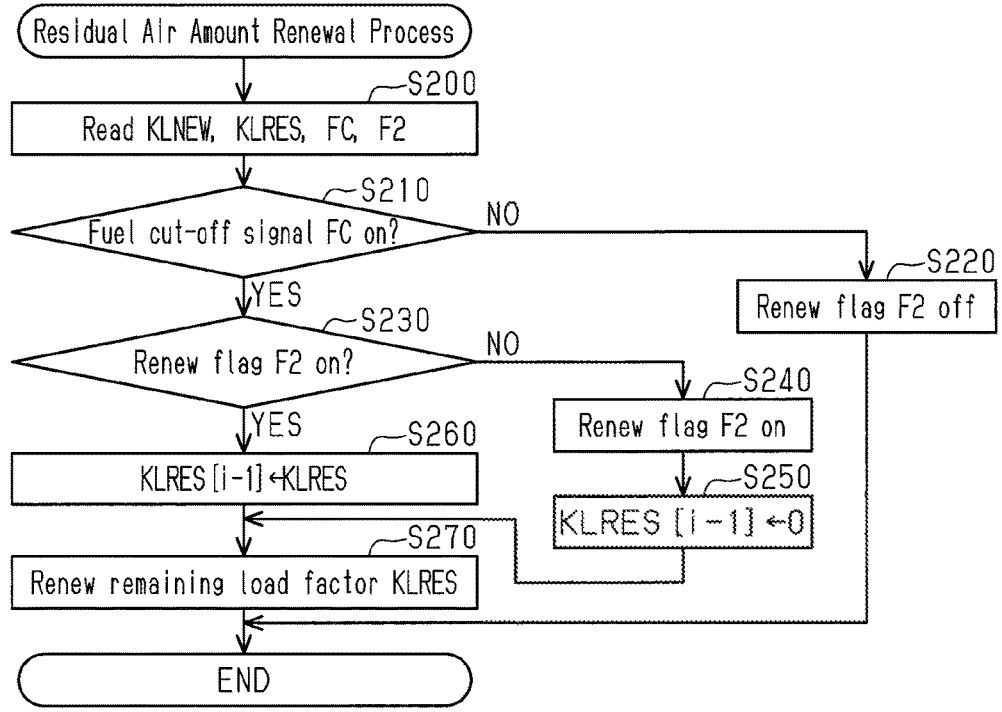
FIG. 4 is a flowchart of a residual air amount calculation process performed by a residual air amount calculation unit in the engine controller shown in FIG. 1.

FIG. 4 is a flowchart of the residual air amount renewal process performed by the residual air amount calculation unit 51. As described above, the residual air amount renewal process is performed in each cycle of the engine 10.

When the residual air amount renewal process starts, the predicted load factor KLNEW, the remaining load factor KLRES, the fuel cut-off signal FC, and a renew flag F2 are read in step S200. It is then determined in step S210 whether the fuel cut-off signal FC is on, that is, whether fuel cut-off is performed. When the fuel cut-off signal FC is off (NO in S210), the process proceeds to step S220 and the renew flag F2 is turned off at S220, and then the process ends. When the fuel cut-off signal FC is on (YES in S210), the process proceeds to step S230.

When the process proceeds to step S230, it is determined in step S230 whether the renew flag F2 is on. When the renew flag F2 is on (YES in S230), the residual air amount calculation unit 51 sets the remaining load factor KLRES read in step S200 as a remaining load factor KLRES before renew (KLRES[i−1]) in step S260 and then the process proceeds to step S270. When the renew flag F2 is off (NO in S230), the residual air amount calculation unit 51 turns on the renew flag F2 in step S240 and sets the remaining load factor KLRES before renew (KLRES[i−1]) to "0" in step S250. The process then proceeds to step S270.

When the process proceeds to step S270, the residual air amount calculation unit 51 renews the remaining load factor KLRES using equation (1) in step S270. "KLRES[i]" represents a remaining load factor KLRES after renewal, and "KLRMX" represents the maximum remaining load factor that is the load factor converted value of the maximum residual air amount that is the residual air amount when all the remaining gas is replaced by air. After the remaining load factor KLRES is renewed, the process ends.

[Equation 1]

$$KLRES[i] = KLRMX \times \frac{KLNEW + KLRES[i-1]}{KLNEW + KLRMX} \quad (1)$$

The maximum remaining load factor KLRMX is calculated from equation (2) using the atmospheric pressure Pa, the standard atmosphere P0, and a compression ratio ε. The standard atmosphere P0 and the compression ratio ε are constants, and in equation (2), the maximum remaining load factor KLRMX is a function of the atmospheric pressure Pa.

[Equation 2]

$$KLRMX = \frac{1}{\varepsilon - 1} \times \frac{Pa}{P0} \quad (2)$$

In such a residual air amount renewal process, the remaining load factor KLRES is renewed using equation (1) in each cycle of the engine 10 during fuel cut-off. After fuel injection restarts, the remaining load factor KLRES is kept at a value renewed last before fuel injection restarts, and the remaining load factor KLRES is reset to "0" when the next fuel cut-off starts.

<Fuel Injection Amount Calculation Process>

Figure 5:
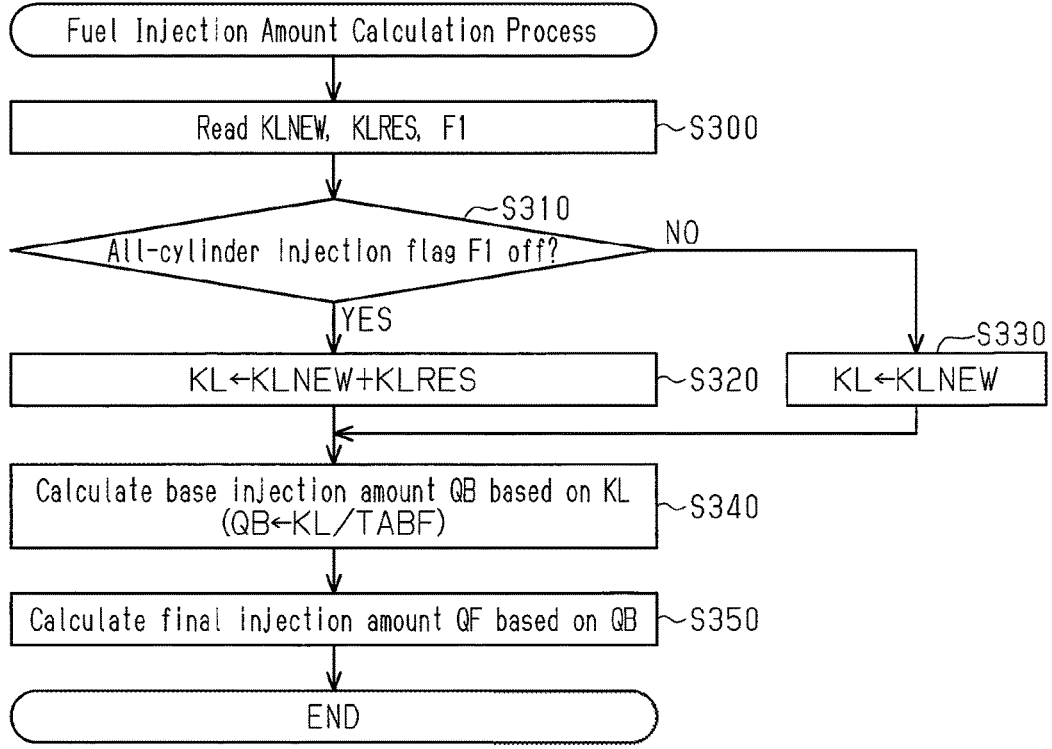
FIG. 5 is a flowchart of a fuel injection amount calculation process performed by a fuel injection amount calculation unit in the engine controller shown in FIG. 1.

FIG. 5 is a flowchart of the fuel injection amount calculation process performed by the fuel injection amount calculation unit 52.

When the fuel injection amount calculation process starts, the predicted load factor KLNEW, the remaining load factor KLRES, and the all-cylinder injection flag F1 are read in step S300. It is then determined in step S310 whether the all-cylinder injection flag F1 is off. When the all-cylinder injection flag F1 is off (YES in S310), the fuel injection amount calculation unit 52 sets the sum of the predicted load factor KLNEW and the remaining load factor KLRES as the load factor KL (KL←KLNEW+KLRES) in step S320, and then the process proceeds to step S340. When the all-cylinder injection flag F1 is on (NO in S310), the predicted load factor KLNEW is set as the load factor KL (KL←KLNEW) in step S330, and the process proceeds to step S340.

When the process proceeds to step S340, the base injection amount QB, which is a base value of the fuel injection amount, is calculated based on the load factor KL in step S340. The fuel injection amount calculation unit 52 then performs, on the base injection amount QB in step S350, corrections including the coolant temperature correction and the air-fuel ratio feedback correction described above to calculating the final injection amount OF. The process then ends.

Operation

The operation of the engine controller according to the present embodiment will now be described.

As described above, in addition to the fresh air drawn in during the present cycle (in-cylinder intake air), the air remaining from the previous cycle exists in the cylinder 11 during combustion. When combustion is successively performed in cycles, all of the remaining gas is burned gas generated by the combustion in the previous cycle and only the in-cylinder intake air contributes to combustion. Combustion does not occur during fuel cut-off and thus the burned gas is replaced by air. When combustion is performed for the first time in each cylinder 11 after fuel injection is restarted, air, in addition to the in-cylinder intake air, contributes to combustion. Specifically, when combustion is performed for the first time in each cylinder 11 after fuel injection is restarted, the in-cylinder intake air and the remaining gas exist in the cylinder 11, the remaining gas contains air, and the in-cylinder intake air and air contribute to combustion. The remaining gas may contain the burned gas.

The fuel injection amount calculation unit 52 of the electronic control unit 42 calculates a fuel injection amount based on the load factor KL. When the all-cylinder injection flag F1 is on, the fuel injection amount calculation unit 52 sets the predicted load factor KLNEW as the load factor KL and calculates the fuel injection amount. When the all-cylinder injection flag F1 is off, the fuel injection amount calculation unit 52 sets the sum of the predicted load factor KLNEW and the remaining load factor KLRES as the load factor KL and calculates the fuel injection amount.

The all-cylinder injection flag F1 is turned off by the all-cylinder injection determination unit 53 when fuel cut-off starts and is turned on by the all-cylinder injection determination unit 53 when fuel injection restarts and then fuel injection is performed in all the cylinders 11 in the engine 10. The fuel injection amount may be calculated during the fuel cut-off, but fuel injection from the fuel injection valve 32 is not performed. The engine controller according to the present embodiment sets the sum of the predicted load factor KLNEW and the remaining load factor KLRES as the load factor KL and calculates the fuel injection amount based on the load factor KL when combustion is performed for the first time in each cylinder 11 after fuel injection is restarted. When combustion is performed subsequent to the first time, the engine controller sets the predicted load factor KLNEW as the load factor KL and calculates the fuel injection amount based on the load factor KL.

The fuel injection amount calculation unit 52 calculates the fuel injection amount by including the remaining load factor KLRES corresponding to the amount of air remaining in the cylinder 11 when combustion is performed for the first time in each cylinder 11 after fuel injection is restarted. Accurate calculation of the remaining load factor KLRES prevents the air-fuel ratio immediately after fuel injection restarts from becoming lean. This ensures the restarting of combustion.

According to the present embodiment, the remaining load factor KLRES is renewed using equation (1) in each cycle of the engine 10 during fuel cut-off. The relationship of equation (1) is defined as follows.

It is assumed that air and burned gas act as ideal gas in the cylinder 11, the temperature of gas in the cylinder 11 is fixed, and intake and exhaust are performed in a non-compressed manner during fuel cut-off.

FIGS. 6A to 6D show the transition of the state of gas in the cylinder 11 in a combustion cycle from when an intake stroke starts until when an exhaust stroke ends during fuel cut-off.

Figure 6A:
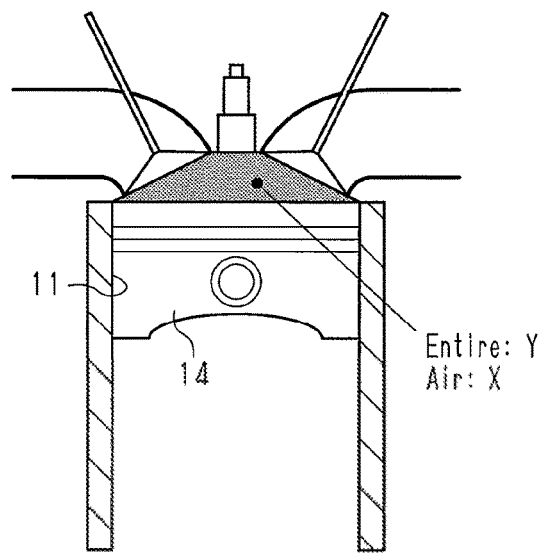
FIGS. 6A to 6D show the transition of the state of a cylinder during fuel cut-off.

FIG. 6A shows the state of gas in the cylinder 11 when an intake stroke starts during fuel cut-off. The remaining gas generated in the previous combustion cycle (remaining gas) exists in the cylinder 11. The amount of the remaining gas is represented by "Y" and the amount of air contained in the remaining gas (remaining air) is represented by "X".

Figure 6B:
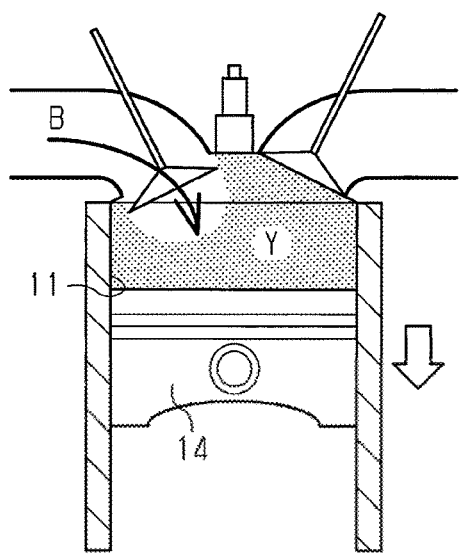

As shown in FIG. 6B, when the intake valve 24 opens, fresh air is drawn into the cylinder 11. The amount of air drawn into the cylinder 11 in the intake stroke, that is, the in-cylinder intake air amount, is represented by "B".

Figure 6C:
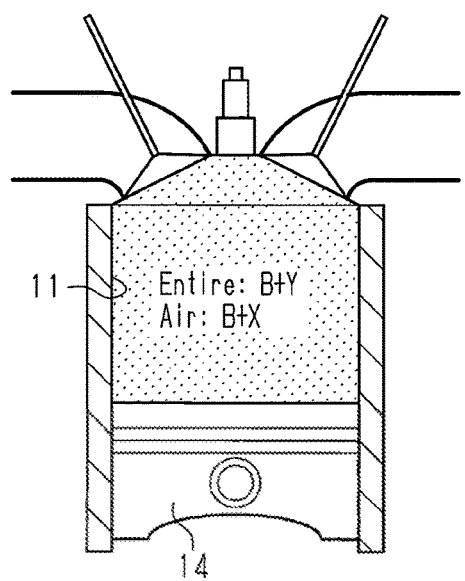

FIG. 6C shows the state of gas in the cylinder 11 when the intake stroke ends. The total amount of gas in the cylinder 11 when the intake stroke ends is represented by "B+Y". The amount of air in the cylinder 11 is represented by "B+X".

Figure 6D:
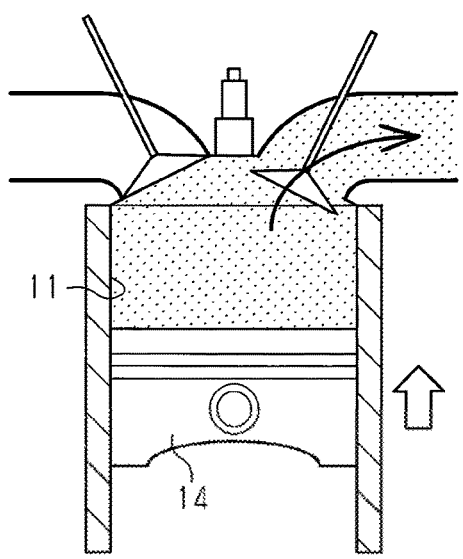

As shown in FIG. 6D, when a compression stroke and an expansion stroke are performed and then an exhaust stroke is performed, "1/ε" of gas in the cylinder 11 remains in the cylinder 11 and "1−1/ε" of gas in the cylinder 11 is externally discharged. It is assumed that gas is completely mixed from the intake stroke to the expansion stroke and thus the composition of gas is homogenous. In such a case, the ratio of air to the gas in the cylinder 11 when the exhaust stroke ends is equal to the ratio of air to the gas in the cylinder 11 when the intake stroke ends. That is, the ratio β of air to gas remaining in the cylinder 11 when the combustion cycle ends is represented by "(B+X)/(B+Y)". The amount of air remaining in the cylinder 11 from the previous combustion cycle is represented by "X[i−1]", and the amount of air remaining in the cylinder 11 until the next combustion cycle is represented by "X[i]". Additionally, assuming that the residual air amount when all the remaining gas is replaced by air, that is, the amount of air having the same molarity as "Y" of the remaining gas is represented by "A", equation (3) below is obtained. The respective amounts of air in equation (3) are then converted into the load factors KL corresponding to the in-cylinder air amounts respectively equal to the amounts of air, so that equation (1) above is obtained.

[Equation 3]

$$X[i]=A\times(B+X[i-1])/(B+A) \quad (3)$$

Figure 7:
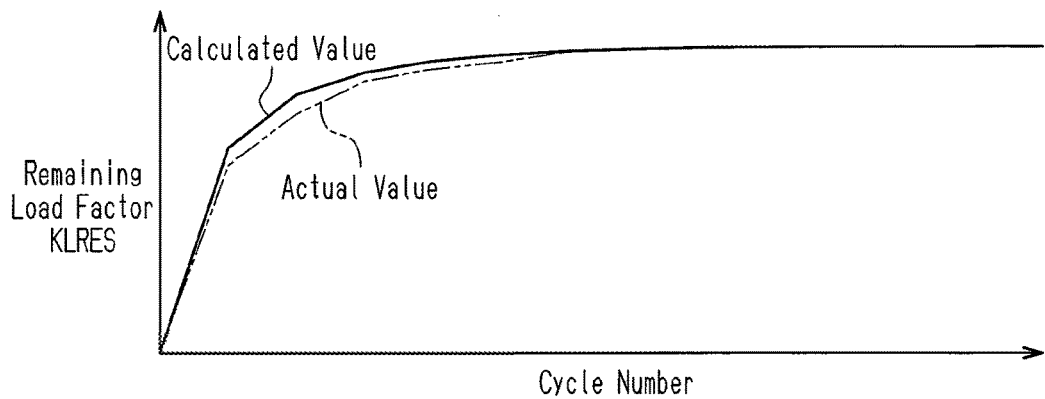
FIG. 7 is a graph showing the transitions of actual measurement values of the residual air amount and calculated values of the residual air amount calculated by the engine controller shown in FIG. 1.

FIG. 7 shows, with a solid line, the transition of calculated values of the remaining load factor KLRES before and after fuel cut-off in the engine controller according to the present embodiment. As shown in FIG. 7, the calculated value of the remaining load factor KLRES is "0" when the fuel cut-off starts and then increases as the number of cycles of intake-exhaust actions in the same cylinder during the fuel cut-off increases. As the number of cycles increases, the remaining load factor KLRES increases gradually. FIG. 7 shows actual measurement values of the remaining load factor KLRES with a two-dot chain line. The deviation of the calculated values from the actual measurement values is small.

As described above, even when fuel cut-off is short and the remaining gas in the cylinder 11 is not completely replaced by air, it is possible to accurately calculate the residual air amount in the cylinder 11 when combustion is performed for the first time after fuel injection is restarted (remaining load factor KLRES) in the present embodiment. Additionally, the engine controller according to the present embodiment calculates the sum of the predicted load factor KLNEW and the remaining load factor KLRES as the load factor KL and then calculates the fuel injection amount based on the load factor KL. That is, the engine controller calculates the fuel injection amount based on the in-cylinder air amount that is the sum of the amount of fresh air drawn into the cylinder 11 and the residual air amount. It is thus possible to prevent an air-fuel ratio from becoming lean because of the remaining air immediately after fuel injection restarts. Consequently, it is possible to reliably prevent the air-fuel ratio after fuel injection restarts from becoming lean.

Second Embodiment

An engine controller according to a second embodiment will now be described. In the second embodiment, same reference numerals are given to those components that are the same as the corresponding components of the first embodiment. Such components will not be described in detail. In the third and fourth embodiments, same reference numerals are also given to those components that are the same as the corresponding components of the first embodiment. Such components will not be described in detail.

Fuel injection temporarily stops in all the cylinders 11 in the engine 10 during fuel cut-off in the engine controller according to the first embodiment. Partial fuel cut-off is sometimes performed in which fuel cut-off is performed in only some of the cylinders 11 of the engine 10.

Figure 8:
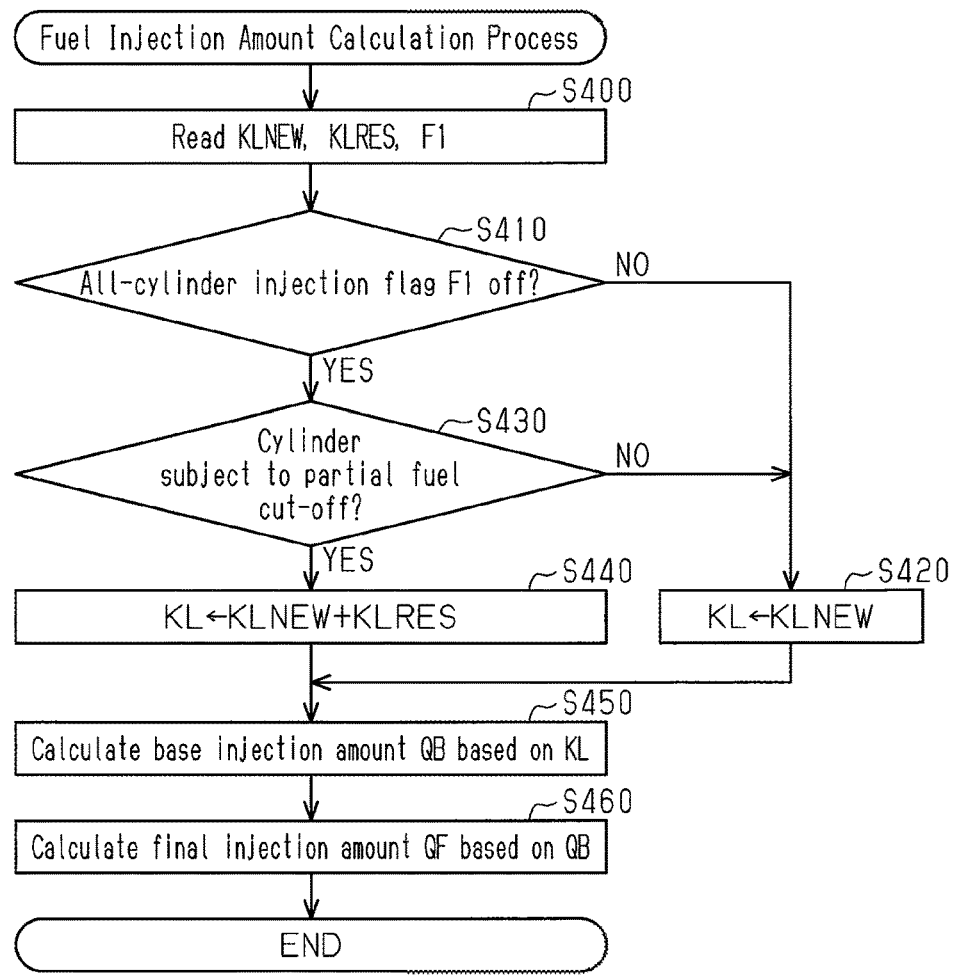
FIG. 8 is a flowchart of a fuel injection amount calculation process performed by a fuel injection amount calculation unit in an engine controller according to a second embodiment.

FIG. 8 is a flowchart of a fuel injection amount calculation process performed by a fuel injection amount calculation unit 52 in the engine controller according to the second embodiment that performs such partial fuel cut-off. The engine controller according to the present embodiment is the same as the engine controller according to the first embodiment except in the contents of the fuel injection amount calculation process.

As shown in FIG. 8, when the fuel injection amount calculation process starts, a predicted load factor KLNEW, a remaining load factor KLRES, and an all-cylinder injection flag F1 are first read in step S400. The fuel injection amount calculation unit 52 determines in step S410 whether the all-cylinder injection flag F1 is off. When the all-cylinder injection flag F1 is on (NO in S410), the predicted load factor KLNEW is set as the load factor KL in step S420 (KL←KLNEW).

When the all-cylinder injection flag F1 is off (YES in S410), the fuel injection amount calculation unit 52 determines in step S430 whether partial fuel cut-off is performed in a cylinder 11, which is the calculation target of the fuel injection amount in the fuel injection amount calculation process, immediately before the process. When it is determined that the partial fuel cut-off is not performed in the cylinder 11 (NO in S430), the process proceeds to step S420, and the predicted load factor KLNEW is set as the load factor KL. When the fuel injection amount calculation unit 52 determines that the partial fuel cut-off is performed in the cylinder 11 that is the calculation target of the fuel injection amount (YES in S430), the process proceeds to step S440.

The fuel injection amount calculation unit 52 sets in step S440 the sum of the predicted load factor KLNEW and the remaining load factor KLRES as the load factor KL (KL←KLNEW+KLRES).

After setting the load factor KL in step S420 or step S440, the process proceeds to step S450. When the process proceeds to step S450, the fuel injection amount calculation unit 52 calculates a base injection amount QB, which is a base value of the fuel injection amount, based on the load factor KL in the same manner as in step S340 of the first embodiment. The fuel injection amount calculation unit 52 performs, on the base injection amount QB in step S460, corrections including a coolant temperature correction and an air-fuel ratio feedback correction in the same manner as in step S350 of the first embodiment to calculate a final injection amount QF. The process then ends.

During the partial fuel cut-off, combustion continues in cylinders 11 other than the calculation target cylinder 11. Consequently, when combustion is performed for the first time in these cylinders 11 after the partial fuel cut-off ends, air is not contained in the remaining gas generated in the previous cycle. When combustion is performed for the first time after the partial fuel cut-off, the engine controller according to the second embodiment calculates the sum of the predicted load factor KLNEW and the remaining load factor KLRES as the load factor KL only for the cylinder 11 undergoing the partial fuel cut-off, and calculates the fuel injection amount based on the load factor KL. That is, when combustion is performed for a first time after the partial fuel cut-off, the engine controller calculates the fuel injection amount without including the remaining load factor KLRES for the cylinders 11 that do not undergo the partial fuel cut-off. The first combustion after the partial fuel cut-off thus occurs at an appropriate air-fuel ratio in the cylinders 11 that undergo the partial fuel cut-off and the cylinders 11 that do not undergo the partial fuel cut-off.

Third Embodiment

In the engine controller according to the first embodiment, the fuel injection amount is increased by the residual air amount (remaining load factor KLRES) when combustion is performed for the first time in each cylinder 11 after fuel injection is restarted, and engine torque increases accordingly. Such an increase in engine torque may not be desirable. According to a third embodiment, when combustion is performed for the first time in the cylinder 11 after fuel injection is restarted, an ignition timing is calculated based on the requested torque and the residual air amount (remaining load factor KLRES) so that the residual air amount (remaining load factor KLRES) increases and the ignition timing is retarded. The increase in engine torque caused by the residual air amount is offset by the retardation of the ignition timing, and thus it is possible to prevent generation of engine torque that exceeds the requested torque immediately after fuel injection is restarted.

Figure 9:
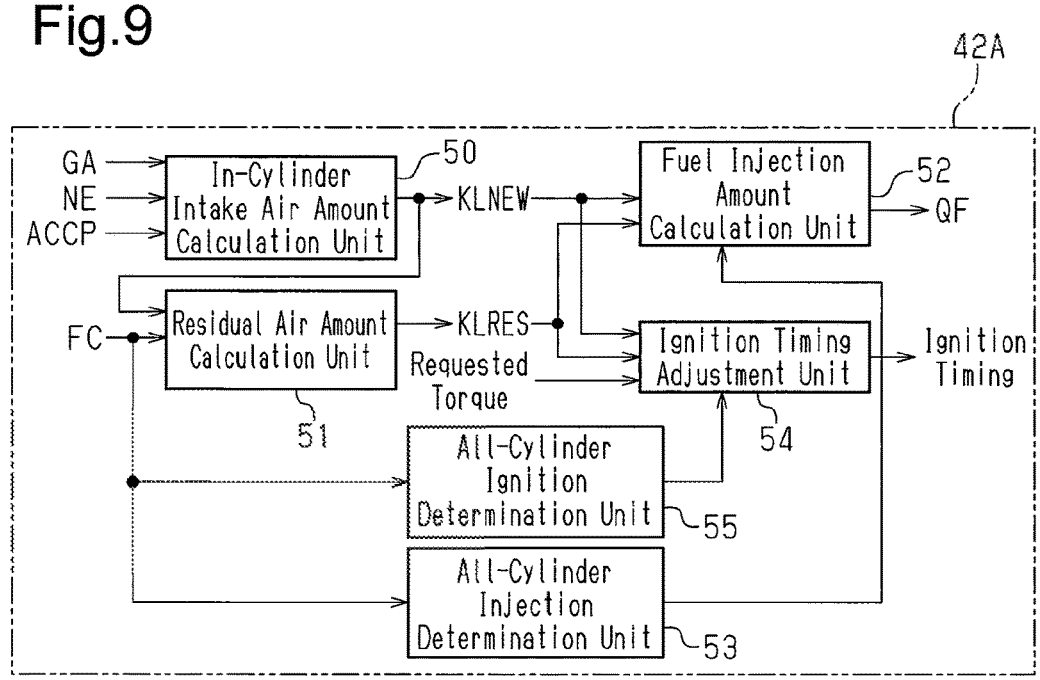
FIG. 9 is a schematic diagram showing the configuration of an engine controller according to a third embodiment.

FIG. 9 shows the control configuration of an electronic control unit 42A that functions as an engine controller according to the present embodiment, executes fuel injection amount control, and adjusts the ignition timing through torque demand control. As shown in FIG. 9, the electronic control unit 42A includes the in-cylinder intake air amount calculation unit 50, the residual air amount calculation unit 51, the fuel injection amount calculation unit 52, the all-cylinder injection determination unit 53, an ignition timing adjustment unit 54, and an all-cylinder ignition determination unit 55. The in-cylinder intake air amount calculation unit 50, the residual air amount calculation unit 51, the fuel injection amount calculation unit 52, and the all-cylinder injection determination unit 53 in the third embodiment have the same functions as the corresponding units in the electronic control unit 42 according to the first embodiment.

The ignition timing adjustment unit 54 performs an ignition timing adjustment process of adjusting the ignition timing according to requested torque. The ignition timing adjustment process is a routine process performed in certain intervals. In the third embodiment, the interval at which the ignition timing adjustment process is performed is equal to the interval at which an in-cylinder air-amount calculation process is performed.

The all-cylinder ignition determination unit 55 performs an all-cylinder ignition determination process of determining whether fuel is ignited by the ignition plug 34 in all cylinders in the engine 10 after fuel injection restarts. The all-cylinder ignition determination process is an interrupt process that is performed whenever ignition is performed in each cylinder 11 in the engine 10.

<All-Cylinder Ignition Determination Process>

Figure 10:
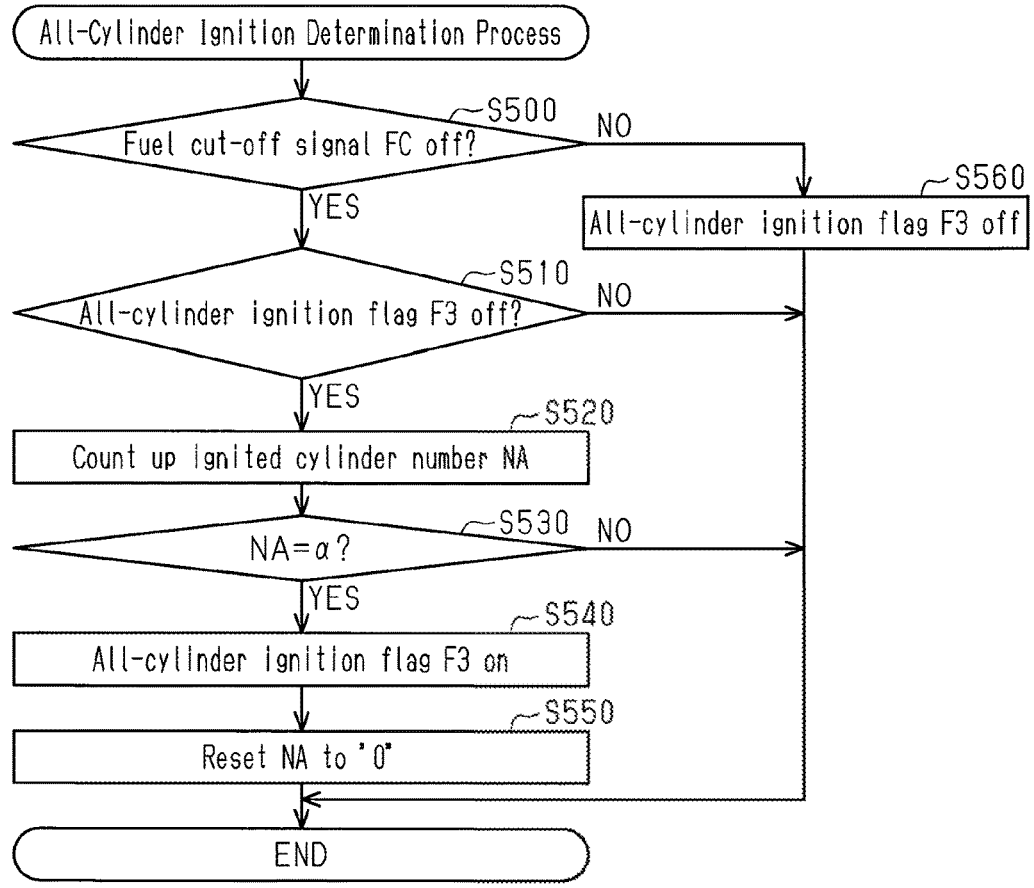
FIG. 10 is a flowchart of an all-cylinder ignition determination process performed by an all-cylinder ignition determination unit in the engine controller shown in FIG. 9.

FIG. 10 is a flowchart of the all-cylinder ignition determination process performed by the all-cylinder ignition determination unit 55. As described above, the all-cylinder ignition determination process is performed whenever ignition is performed in each cylinder 11. The number of times that the all-cylinder ignition determination process is performed in a predetermined period is equal to the number of times that ignition is performed in the predetermined period.

When the all-cylinder ignition determination process starts, the all-cylinder ignition determination unit 55 determines in step S500 whether a fuel cut-off signal FC is off. When the fuel cut-off signal FC is on, that is, when fuel cut-off is performed (NO in S500), an all-cylinder ignition flag F3 is turned off in step S560, and then this process ends.

When the fuel cut-off signal FC is off (YES in S500), the process proceeds to step S510, and the all-cylinder ignition determination unit 55 determines in step S510 whether the all-cylinder ignition flag F3 is off. When the all-cylinder ignition flag F3 is on (NO in S510), this process ends. When the all-cylinder ignition flag F3 is off (YES in S510), the process proceeds to step S520.

When the process proceeds to step S520, the number NA of ignited cylinders, which is a counter for counting the number of the cylinders 11 that perform ignition after fuel injection restarts, is counted up in step S520. The all-cylinder ignition determination unit 55 determines in step S530 whether the number NA of ignited cylinders is equal to the number α of cylinders in the engine 10 ("8" in the third embodiment). When the number NA of ignited cylinders is less than the number α of cylinders (NO in S530), the process ends. When the number NA of ignited cylinders is equal to the number α of cylinders (YES in S530), the process proceeds to step S540.

When the process proceeds to step S540, the all-cylinder ignition flag F3 is turned on in step S540. The number of ignited cylinders NA is reset to "0" in step S550 and then the process in the routine ends.

In the all-cylinder ignition determination process, the all-cylinder ignition flag F3 is turned off when fuel cut-off starts. After fuel injection restarts, the number NA of ignited cylinders is counted up whenever the all-cylinder ignition determination process is performed. When the number NA of ignited cylinders is equal to the number α of cylinders in the engine 10, the all-cylinder ignition flag F3 is turned on. The all-cylinder ignition determination process is performed whenever ignition is performed in each cylinder 11 in the engine 10 as described above, and thus the number NA of ignited cylinders is equal to the number of times that ignition is performed in the engine 10 after fuel injection restarts. The all-cylinder ignition flag F3 is turned on when the number of times that fuel injection is performed in the engine 10 after fuel injection restarts is equal to the number α of cylinders in the engine 10, that is, when ignition is performed in all the cylinders 11 in the engine 10 after fuel injection restarts. The all-cylinder ignition determination unit 55 turns the all-cylinder ignition flag F3 from off to on to externally output a determination result as to whether ignition is performed in all cylinders 11 in the engine 10 after fuel injection restarts.

<Ignition Timing Adjustment Process>

Figure 11:
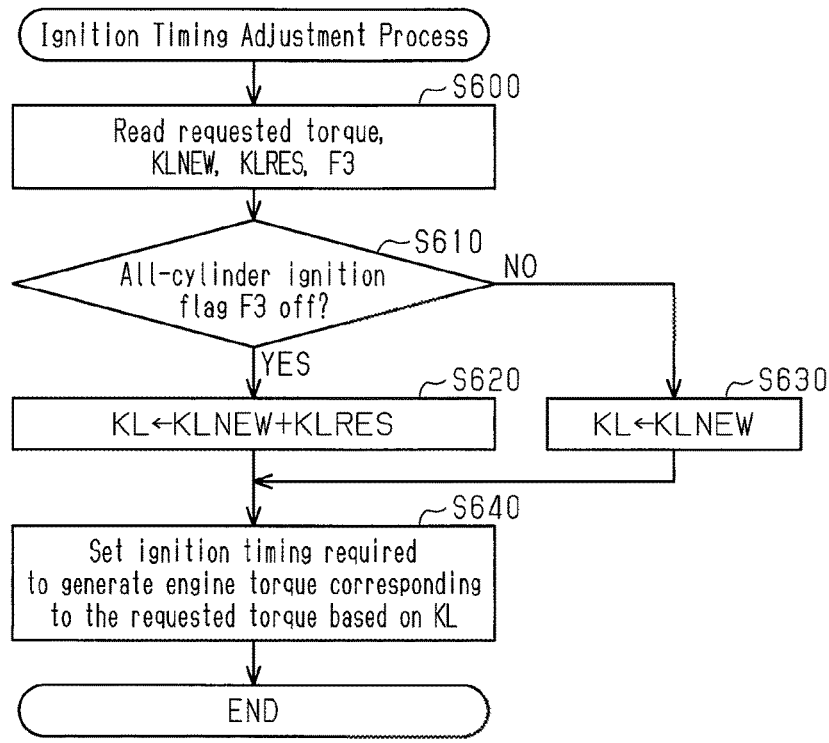
FIG. 11 is a flowchart of an ignition timing adjustment process performed by an ignition timing adjustment unit in the engine controller shown in FIG. 9.

FIG. 11 is a flowchart of the ignition timing adjustment process performed by the ignition timing adjustment unit 54. As described above, the ignition timing adjustment process is a routine process performed in certain intervals.

When the ignition timing adjustment process starts, the requested torque, the predicted load factor KLNEW, the remaining load factor KLRES, and the all-cylinder ignition flag F3 are read in step S600. The ignition timing adjustment unit 54 then determines in step S610 whether the all-cylinder ignition flag F3 is off. When the all-cylinder ignition flag F3 is off (YES in S610), the ignition timing adjustment unit 54 sets the sum of the predicted load factor KLNEW and the remaining load factor KLRES as the load factor KL (KL←KLNEW+KLRES) in step S620 and then the process proceeds to step S640. When the all-cylinder ignition flag F3 is on (NO in S610), the ignition timing adjustment unit 54 sets the predicted load factor KLNEW as the load factor KL (KL←KLNEW) in step S630 and then the process proceeds to step S640.

When the process proceeds to step S640, the ignition timing adjustment unit 54 sets, based on the load factor KL and the requested torque, the ignition timing required to generate engine torque corresponding to the requested torque. Specifically, the ignition timing is retarded from the optimum ignition timing at which the combustion efficiency is maximized.

After setting the ignition timing, the process ends. The ignition timing adjustment unit 54 may set the ignition timing regardless of whether fuel cut-off is being performed. Not only fuel injection but also ignition stops during the fuel cut-off as described above, and thus if the ignition timing is set during the fuel cut-off, ignition is actually not performed.

According to the third embodiment, the predicted load factor KLNEW is usually calculated as the load factor KL and the ignition timing for generating engine torque corresponding to the requested torque is adjusted based on the load factor KL. However, when combustion is performed for the first time in the cylinder 11 after fuel injection is restarted, the sum of the predicted load factor KLNEW and the remaining load factor KLRES is calculated as the load factor KL, and the ignition timing is adjusted based on the load factor KL.

When the load factor KL is increased while the rotational speed NE of engine is fixed, it is necessary to retard the ignition timing according to the increase in the load factor KL in order to keep engine torque. Consequently, as the residual air amount (remaining load factor KLRES) is increased, the engine controller retards the ignition timing when combustion is performed for the first time in the cylinder 11 after fuel injection is restarted. The increase in engine torque caused by the residual air amount is offset by the retardation of the ignition timing, and thus it is possible to prevent the generation of engine torque that exceeds the requested torque immediately after fuel injection restarts.

While calculation of the fuel injection amount by the fuel injection amount calculation unit 52 is performed as a fixed crank angle process as described above, setting of the ignition timing by the ignition timing adjustment unit 54 is performed as a routine process. The period during which a calculated value of the fuel injection amount is used for the first combustion in cylinders after fuel injection is restarted differs from the period during which a calculated value of the ignition timing is used for the first combustion in the cylinders after fuel injection restarts. That is, the timing when reflection of the remaining load factor KLRES ends in calculating the fuel injection amount differs from the timing when reflection of the remaining load factor KLRES ends in calculating the ignition timing. In the engine controller, the all-cylinder injection determination unit 53 and the all-cylinder ignition determination unit 55 respectively determine the timing when reflection of the residual air amount (remaining load factor KLRES) after fuel injection restarts ends in calculating the fuel injection amount and the ignition timing. It is thus possible to reflect the residual air amount (remaining load factor KLRES) after fuel injection restarts for an appropriate period in respectively calculating the fuel injection amount and the ignition timing.

Fourth Embodiment

The engine controller according to the third embodiment adjusts the ignition timing to prevent engine torque that exceeds requested torque after fuel injection restarts caused by the residual air amount in the cylinder 11 from being generated. An engine controller according to a fourth embodiment reduces the amount of air supplied to the cylinder 11 by the remaining load factor KLRES by controlling the valve timing varying mechanism 25 to avoid excessive engine torque caused by the remaining air.

Figure 12:
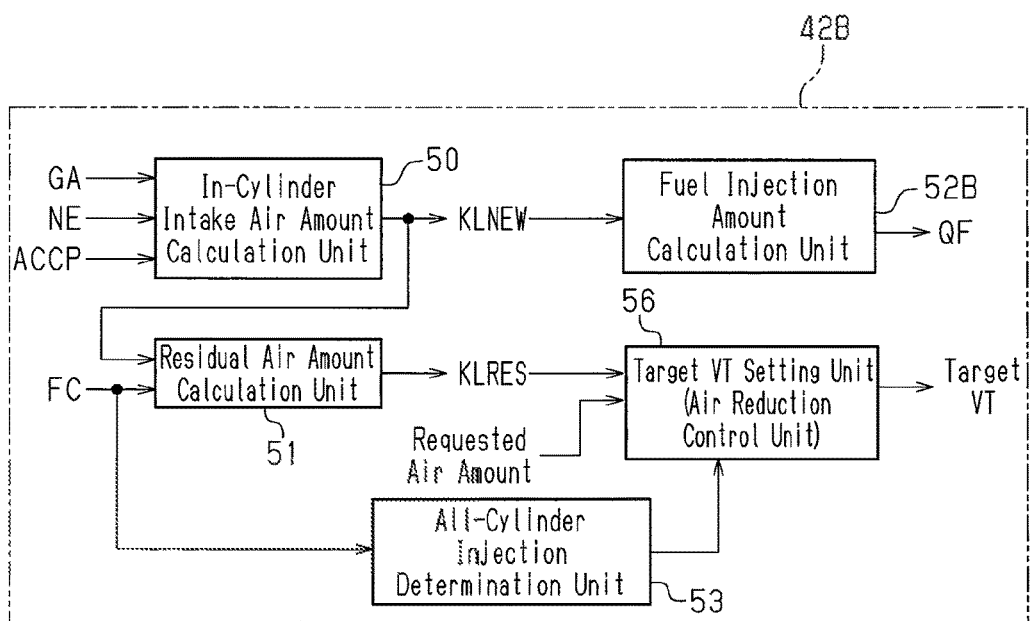
FIG. 12 is a schematic diagram showing the configuration of an engine controller according to a fourth embodiment.

FIG. 12 shows the control configuration of an electronic control unit 42B that functions as the engine controller according to the fourth embodiment, executes fuel injection amount control and valve timing control. As shown in FIG. 12, the electronic control unit 42B includes the in-cylinder intake air amount calculation unit 50, the residual air amount calculation unit 51, a fuel injection amount calculation unit 52B, the all-cylinder injection determination unit 53, and a target VT setting unit 56. The in-cylinder intake air amount calculation unit 50, the residual air amount calculation unit 51, and the all-cylinder injection determination unit 53 in the fourth embodiment have the same functions as the corresponding units of the electronic control unit 42 according to the first embodiment.

The target VT setting unit 56 performs a target VT setting process of setting a target valve timing (a target VT) that is the target value of the valve timing of the intake valve 24 that can be varied by the valve timing varying mechanism 25. The target VT setting process is performed as part of the torque demand control. Although not shown in FIG. 12, the intake air flow amount GA and the rotational speed NE of engine are also input to the target VT setting unit 56.

The fuel injection amount calculation unit 52B according to the fourth embodiment sets the predicted load factor KLNEW as the load factor KL regardless of the first combustion in the cylinder 11 after fuel injection restarts, and calculates the fuel injection amount based on the load factor KL.

Figure 13:
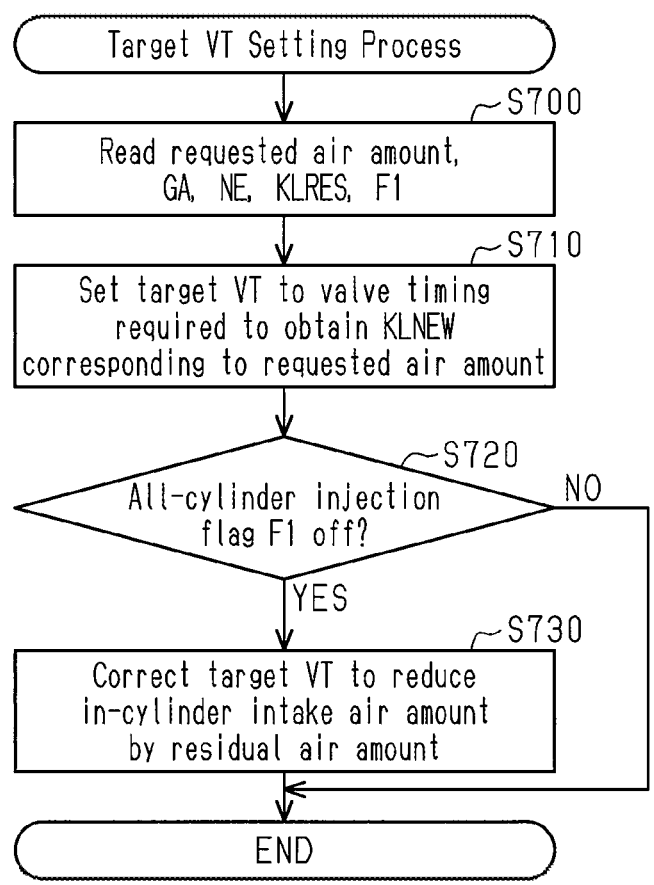
FIG. 13 is a flowchart of a target VT setting process performed by a target VT setting unit in the engine controller shown in FIG. 12.

FIG. 13 is a flowchart of the target VT setting process performed by the target VT setting unit 56. The target VT setting process is performed in each cycle of the engine 10 as a fixed crank angle process for each predetermined crank angle, the number of times equal to the number of the cylinders 11 in the engine 10. The target VT setting process is performed before each cylinder 11 reaches the intake top dead center.

When the target VT setting process starts, the requested air amount, the remaining load factor KLRES, the intake air flow amount GA, the rotational speed NE of engine, and the all-cylinder injection flag F1 are first read in step S700. The target VT setting unit 56 sets in step S710 the target VT that is the valve timing of the intake valve 24 required to obtain the in-cylinder intake air amount corresponding to the requested air amount (predicted load factor KLNEW) based on the requested air amount, the rotational speed NE of engine, and the intake air flow amount GA.

The target VT setting unit 56 determines in step S720 whether the all-cylinder injection flag F1 is off. When the all-cylinder injection flag F1 is on (NO in S720), this process ends. The valve timing varying mechanism 25 is then controlled according to the target VT set in step S710.

When the all-cylinder injection flag F1 is off (YES in S720), the process proceeds to step S730. The target VT is corrected in step S730 such that the in-cylinder intake air amount is reduced by the residual air amount, and then this process ends. That is, the target VT setting unit 56 sets, as the target VT after correction, the valve timing of the intake valve 24 at which the in-cylinder intake air amount is less than the requested air amount by the residual air amount.

The engine controller according to the fourth embodiment controls the in-cylinder intake air amount to be less than the requested air amount required to obtain the requested torque by the residual air amount for the period from when fuel cut-off starts until when fuel injection is performed in all the cylinders 11 in the engine 10 after fuel injection restarts, that is, for the period during which the remaining air exists in the cylinder 11. The amount of air equal to the residual air amount exists in the cylinder 11 from the previous cycle. The amount of air used for combustion in the cylinder 11 is thus equal to the requested air amount, and it is possible to prevent generation of engine torque that exceeds the requested torque immediately after fuel injection is restarted.

The in-cylinder intake air amount calculation unit 50 calculates the predicted load factor KLNEW without including the result of setting the target VT in the target VT setting process. The predicted load factor KLNEW thus depends on the actual in-cylinder air amount regardless of whether the in-cylinder intake air amount is reduced by correcting the target VT. The fuel injection amount calculation unit 52B always sets the predicted load factor KLNEW as the load factor KL and calculates the fuel injection amount based on the load factor KL. Fuel injection is thus performed according to the air amount actually used for combustion (in-cylinder air amount) regardless of whether the residual air amount exists, so that it is possible to prevent the air-fuel ratio ABF from deviating from the target air-fuel ratio TABF caused by the residual air amount.

The inflow efficiency of intake air into the cylinder 11 is improved by adjusting the timing of opening or closing the intake valve 24 according to the movement speed of the piston 14 and the flow rate of intake air. The valve timing varying mechanism 25 is originally provided to vary the valve timing of the intake valve 24 for the purpose of improving the inflow efficiency of intake air into the cylinder 11 according to the operational condition of the engine 10. If the valve timing varying mechanism 25 varies the valve timing of the intake valve 24 so as to reduce the inflow efficiency of intake air, the predicted load factor KLNEW can be reduced. The predicted load factor KLNEW can be varied with higher response by varying the valve timing of the intake valve 24 as compared to changing the open degree of the throttle valve 21 from a position distant to the cylinder 11.

Only when combustion is performed for the first time in the cylinder 11 after fuel injection is restarted, air still exists in the cylinder 11 from the previous cycle. The reduction of the predicted load factor KLNEW by the remaining load factor KLRES preferably ends immediately when fuel injection is performed in all of the cylinders 11 of the engine 10 after fuel injection is restarted. The predicted load factor KLNEW is thus reduced by the remaining load factor KLRES using the valve timing varying mechanism 25.

It should be apparent to those skilled in the art that the present invention may be embodied in many other specific forms without departing from the spirit or scope of the invention. Particularly, it should be understood that the present invention may be embodied in the following forms.

In the engine controller according to the fourth embodiment, the target VT setting unit 56 functions as an air reduction control unit. That is, the target VT setting unit 56 reduces the in-cylinder air amount using the valve timing varying mechanism 25 that varies the valve timing of the intake valve 24, when combustion is performed for the first time in the cylinder 11 after fuel injection is restarted. Variable valve mechanisms include a mechanism that varies valve characteristics other than the valve timing, such as a lift variable mechanism that varies a valve lift amount. Such variable valve mechanisms other than the valve timing variable mechanism are also capable of reducing the in-cylinder air amount as described above. Another variable valve mechanism may be provided in the engine 10 instead of the valve timing varying mechanism 25, and the in-cylinder air amount may be reduced using this variable valve mechanism. This functions to perform the process executed by the air reduction control unit.

In the engine controller according to the first to fourth embodiments, the residual air amount calculation unit 51 renews the remaining load factor KLRES using equation (1) in each cycle of the engine 10 during fuel cut-off from when the fuel cut-off starts until when fuel injection restarts. The remaining load factor KLRES may be calculated by other methods. For example, the remaining load factor KLRES may be renewed using equations other than equation (1). Alternatively, the relationship between the number of cycles in the engine 10 from when fuel cut-off starts and the remaining load factor KLRES, the relationship being determined in advance by experiments may be stored in the electronic control unit 42 as a map, and the remaining load factor KLRES may be calculated using the map from the number of cycles in the engine 10 from when the fuel cut-off starts until when fuel injection restarts. If the remaining load factor KLRES is calculated in a manner that as the number of cycles of intake-exhaust actions in the cylinder 11 during the fuel cut-off is increased, the remaining load factor KLRES is increased, it is possible to more accurately calculate the remaining load factor KLRES as compared to a case of calculating the remaining load factor KLRES regardless of the number of cycles.

While the engine controller according to the first to fourth embodiments controls the torque of the engine 10 through torque demand control, the fuel injection amount calculation process of the fuel injection amount calculation unit 52 according to the first embodiment or the second embodiment may be performed even when the torque demand control is not executed.

The maximum remaining load factor KLRMX is calculated as a function of the atmospheric pressure Pa as indicated by equation (2) in the first to fourth embodiments, the maximum remaining load factor KLRMX may be set by other methods. For example, the maximum remaining load factor KLRMX may be a constant.

The present examples and embodiments are to be considered as illustrative and not restrictive, and the invention is not to be limited to the details given herein, but may be modified within the scope and equivalence of the appended claims.

The invention claimed is:

1. An engine controller configured to perform fuel cut-off, which temporarily stops fuel injection, calculate an in-cylinder air amount, which is an amount of air used for combustion in a cylinder, and control an engine based on the in-cylinder air amount, the engine controller comprising:
   a residual air amount calculation unit configured to calculate a residual air amount that is an amount of air in the cylinder remaining from a previous cycle during the fuel cut-off, the residual air amount increasing as a number of cycles of intake-exhaust actions in the cylinder increases during the fuel cut-off.

2. The engine controller according to claim 1, wherein the residual air amount calculation unit is configured to set the residual air amount when fuel cut-off starts to "0" and renew the residual air amount in each cycle of the engine during a period from when the fuel cut-off starts to when the fuel injection restarts using an equation of $X[i]=A \times (B+X[i-1])/(B+A)$ where "X[i−1]" represents a residual air amount before renewal, "X[i]" represents a residual air amount after renewal, "B" represents an in-cylinder intake air amount that is the amount of fresh air drawn into a cylinder from an intake air passage during an intake stroke, and "A" represents a maximum residual air amount that is the amount of air when gas remaining in the cylinder from a previous cycle is all air.

3. The engine controller according to claim 1, further comprising a fuel injection amount calculation unit configured to calculate a fuel injection amount that corresponds to the in-cylinder air amount,
   wherein the fuel injection amount calculation unit is configured to calculate a fuel injection amount for when combustion is performed for a first time in the cylinder after fuel injection is restarted by setting the in-cylinder air amount to a sum of the residual air amount and an in-cylinder intake air amount that is an amount of fresh air drawn into a cylinder from an intake air passage during an intake stroke and calculate the fuel injection amount for when combustion is performed subsequent to the first time by setting the in-cylinder intake air amount as the in-cylinder air amount.

4. The engine controller according to claim 3, wherein the engine includes a plurality of cylinders,
   the engine controller is configured to perform partial fuel cut-off in which fuel cut-off is performed in some of the cylinders, and
   the fuel injection amount calculation unit is configured to calculate, when the partial fuel cut-off ends and the fuel injection restarts, the fuel injection amount based on the sum of the residual air amount and the in-cylinder intake air amount for only the cylinders that have been subject to the partial fuel cut-off.

5. The engine controller according to claim 3, further comprising:
   an in-cylinder intake air amount calculation unit that calculates the in-cylinder intake air amount as a routine process performed in certain intervals; and
   an all-cylinder injection determination unit that determines whether or not fuel injection has been performed in all of the cylinders of the engine after the fuel injection is restarted,
   wherein the fuel injection amount calculation unit is configured to calculate the fuel injection amount as a fixed crank angle process, start calculation of the fuel injection amount based on the sum of the residual air amount and the in-cylinder intake air amount when fuel injection is restarted, and end the calculation of the fuel injection amount when the all-cylinder injection determination unit makes an affirmative determination.

6. The engine controller according to claim 3, further comprising an ignition timing adjustment unit that adjusts an ignition timing in accordance with a requested torque that is a requested value of engine torque,
   wherein the ignition timing adjustment unit is configured to adjust the ignition timing based on the requested torque and the residual air amount so that the ignition timing is retarded as the residual air amount increases when combustion is performed for the first time in the cylinder after fuel injection is restarted.

7. The engine controller according to claim 6, further comprising:
   an all-cylinder injection determination unit configured to determine whether or not fuel injection has been performed in all of the cylinders of the engine after fuel injection is restarted; and
   an all-cylinder ignition determination unit configured to determine whether or not ignition has been performed in all of the cylinders of the engine after fuel injection is restarted;
   wherein the fuel injection amount calculation unit calculates the fuel injection amount as a fixed crank angle process, starts calculation of the fuel injection amount based on the sum of the residual air amount and the in-cylinder intake air amount when fuel injection is restarted, and ends the calculation of the fuel injection amount when the all-cylinder injection determination unit makes an affirmative determination, and
   the ignition timing adjustment unit adjusts the ignition timing as a routine process performed in certain intervals, and starts adjustment of the ignition timing based on the requested torque and the residual air amount when fuel injection restarts and ends the adjustment of the ignition timing when the all-cylinder ignition determination unit makes an affirmative determination.

8. The engine controller according to claim 1, wherein the engine includes a variable valve mechanism that varies a valve characteristic of an intake valve, the engine controller comprising:
   an air reduction control unit configured to control the variable valve mechanism in accordance with the residual air amount so that the in-cylinder intake air amount decreases as the residual air amount increases when combustion is performed for the first time in the cylinder after fuel injection is restarted.

9. A method for controlling an engine, the method comprising:
   performing fuel cut-off to temporarily stop fuel injection;

obtaining an in-cylinder air amount that is an amount of air used for combustion in a cylinder and controlling an engine based on the in-cylinder air amount; and calculating a residual air amount that is an amount of air in the cylinder remaining from a previous cycle during the fuel cut-off, the residual air amount increasing as a number of cycles of intake-exhaust actions in the cylinder increases during the fuel cut-off.

10. An engine controller comprising circuitry, wherein the circuitry is configured to:

perform fuel cut-off to temporarily stop fuel injection;

obtain an in-cylinder air amount that is an amount of air used for combustion in a cylinder and control an engine based on the in-cylinder air amount; and calculate a residual air amount that is an amount of air in the cylinder remaining from a previous cycle during the fuel cut-off, the residual air amount increasing as a number of cycles of intake-exhaust actions in the cylinder increases during the fuel cut-off.

* * * * *